UNITED STATES PATENT OFFICE.

ARTHUR W. HIXSON, OF LEONIA, NEW JERSEY.

DRIED YEAST AND METHOD OF MAKING THE SAME.

1,420,630.   Specification of Letters Patent.   Patented June 27, 1922.

No Drawing.   Application filed December 20, 1920.   Serial No. 432,038.

*To all whom it may concern:*

Be it known that I, ARTHUR W. HIXSON, a citizen of the United States, residing at Leonia, in the county of Bergen and State of New Jersey, have invented certain new and useful Improvements in Dried Yeast and Methods of Making the Same, of which the following is a specification.

This invention relates to dried yeast, and methods of making the same, and it comprises a dried yeast formed by comminuting ordinary compressed yeast, and from 0.5 to 5 per cent by weight of nearly insoluble calcium salts, care being taken to prevent the formation of lumps or balls during the comminuting step, and then drying the comminuted product by subjecting it to a drying operation in which the temperature, humidity, and other conditions are so controlled that the moisture content will be gradually reduced from the moisture content of ordinary compressed yeast, about 70 per cent, to about 10 per cent in a period of time extending from 12 to 30 hours, and preferably about 18 hours.

In the present invention, I have produced a method of drying compressed yeast in which the yeast is subjected to a slow, even, gradual drying, extending over a period of time greater than 12 hours, and preferably about 18 hours. I have found that when this process is employed, the yeast having been previously comminuted, that a product can be obtained which retains its baking strength for a longer period of time than the ordinary compressed yeast, and which is much more suitable for handling in transportation.

The use of dried yeast would have several important advantages over ordinary compressed yeast. The weight of the dried yeast is about one-third the weight of compressed yeast, and it occupies about one-half as much space. In addition, it may be kept at ordinary temperatures for periods of about three months without losing enough baking strength to become objectionable, whereas compressed yeast cannot be kept without deterioration longer than one week even in a refrigerator.

I am aware of several prior processes for producing dried yeast, wherein a small amount of yeast is mixed with a carbohydrate substance, such as corn meal or the like, but such products are not at all similar to the product herein disclosed, and are not suitable for large scale commercial baking purposes. The yeast content of these products is very low, usually less than 5 per cent whereas my product contains 85-90 per cent or more of yeast.

It is the primary object of the present invention to dry yeast in such a way as to obtain a product of high yeast content, high degree of purity, and of such keeping qualities that it will have a baking strength equal to or better than compressed yeast after a period of two or three months, when treated as hereinafter directed.

In preparing dried yeast according to my process, ordinary compressed yeast is subdivided into small pieces and placed in a layer of proper thickness in any type of air or vacuum drier which will not grind or ball up, or rub the yeast during the process and which will permit of occasional stirring with a sharp rake or other suitable device, and will permit of moving the trays or other receptacles to fully utilize the air supply. The air to which the yeast is subjected for drying must be so conditioned by any of the ordinary methods in use, with reference to humidity, velocity, volume and temperature, that the individual pieces of yeast shall be dried very gradually, taking from 12 to 30 hours to reduce the moisture content from that of ordinary compressed yeast (about 70 per cent) to about 10 per cent.

While yeast made from any suitable source of carbohydrates may be employed, in practicing the process, I have found that yeast from one particular source is more suitable for drying. I find it advantageous to employ yeast made from molasses, either beet or cane molasses, mixed, or separate, as such yeast seems more hardy, more resistant to the changes involved in drying, and the dried product obtained tends to keep its baking strength for a longer time than dried yeast prepared from compressed yeast obtained from any other source of carbohydrates.

In preparing the yeast for the drying operation, compressed yeast prepared from beet or cane molasses, or obtained from any other source of carbohydrates, is first subdivided into small pieces, or in strings to increase the relative proportion of surface to the weight of the yeast. In sub-dividing the yeast, it is necessary that it be cut or chopped with sharp instruments to prevent grinding or rubbing which causes formation of small balls, hard to break up and difficult to dry. In preparing the yeast for the drying operation, I have found that the yeast may be properly sub-divided by the use of a chopping machine wherein it is cut by knives into pieces from 2 to 25 cubic millimeters in volume. Satisfactory comminution has been obtained by squeezing the compressed yeast through a perforated plate, similar to a spaghetti machine, so that it assumes the form of strings.

The comminuted yeast is then placed in trays or other receptacles in layers of proper thickness and arranged in any suitable type of air or vacuum drier wherein it may be occasionally stirred with a sharp rake without grinding or rubbing and wherein the trays may be moved at different periods to fully utilize the air supply. The air employed in the drying operation is so conditioned that a slow, even, gradual drying of the yeast will be obtained and a period of from 12 to 30 hours will be required to reduce the moisture content to about 10 per cent.

In one form of the invention, I have found that the drying process can be facilitated and somewhat shortened without injury to the baking quality of the yeast, and with an increase in its keeping qualities, by mixing, before sub-dividing, a quantity of from 0.5 to 5 per cent, and preferably about 1½ per cent by weight of the undried yeast, of plaster of Paris unsaturated with water, to aid in the process of dehydration. I have also employed calcium mono-hydrogen phosphate, in a proportion of less than 1 per cent by weight of the undried yeast to increase the keeping qualities of the dried yeast. Any other of the nearly insoluble calcium salts may be employed in place of calcium phosphate.

I have found that yeast dried in this manner retains its baking strength very well for a period of from three weeks to one month, but gradually deteriorates somewhat thereafter. This deterioration can be overcome by pretreating the yeast before it is used for baking, in the manner described in my co-pending application Serial No. 432,037, filed December 20, 1920.

While I have described in detail the preferred practice of my process, it is to be understood that the details of procedure may be widely varied, without departure from the spirit of the invention or the scope of the subjoined claims.

Having thus described my invention, I claim:

1. A process of making dried yeast, which consists in subjecting compressed yeast to slow, gradual drying for a protracted period until a product containing substantially 10 per cent of moisture is obtained.

2. A process of making dried yeast, which consists in comminuting compressed yeast, subjecting it to slow, gradual drying for a protracted period until a product containing substantially 10 per cent of moisture is obtained, and agitating the material during the drying operation.

3. A process of making dried yeast, which consists in mixing compressed yeast and less than 5 per cent by weight of the yeast of a nearly insoluble calcium salt, comminuting the mixture, and subjecting it to slow, gradual drying for a protracted period until a product containing substantially 10 per cent of moisture is obtained.

4. A dried yeast product having a yeast content greater than 80 per cent.

5. A dried yeast product containing less than 20 per cent of moisture, and being substantially free of inert substances.

6. A dried yeast product having a yeast content of more than 85 per cent and containing less than 5 per cent by weight of a nearly insoluble calcium salt.

7. A dried yeast product made from molasses and containing less than 20 per cent of moisture.

In testimony whereof I affix my signature in presence of two witnesses.

ARTHUR W. HIXSON.

Witnesses:
MARTIN ALBERTS,
FRANK C. ERB.